(12) United States Patent
Mulligan et al.

(10) Patent No.: US 6,797,220 B2
(45) Date of Patent: Sep. 28, 2004

(54) METHODS FOR PREPARATION OF THREE-DIMENSIONAL BODIES

(75) Inventors: Anthony C. Mulligan, Tucson, AZ (US); Mark J. Rigali, Tucson, AZ (US); Manish P. Sutaria, Philadelphia, PA (US); Gregory J. Artz, Tucson, AZ (US); Felix H. Gafner, Tucson, AZ (US); K. Ranji Vaidyanathan, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 10/005,656

(22) Filed: Dec. 4, 2001

(65) Prior Publication Data

US 2002/0165304 A1 Nov. 7, 2002

Related U.S. Application Data

(60) Provisional application No. 60/251,171, filed on Dec. 4, 2000.

(51) Int. Cl.⁷ .................................................. B28B 5/00
(52) U.S. Cl. ...................... 264/241; 264/308; 264/638; 264/642; 419/65; 419/67
(58) Field of Search ................................ 264/241, 308, 264/638, 642; 419/65, 67

(56) References Cited

U.S. PATENT DOCUMENTS

| | | | |
|---|---|---|---|
| 4,772,524 A | | 9/1988 | Coblenz |
| 5,053,092 A | * | 10/1991 | Lachman |
| 5,116,663 A | | 5/1992 | Fujimoto |
| 5,120,688 A | | 6/1992 | Hsieh |
| 5,294,387 A | | 3/1994 | Nakano |
| 5,398,193 A | * | 3/1995 | deAngelis |
| 5,588,997 A | | 12/1996 | Lysson et al. |
| 5,645,781 A | | 7/1997 | Popovic' et al. |
| 5,679,157 A | | 10/1997 | Milliman |
| 6,046,499 A | | 4/2000 | Yano |
| 6,063,502 A | | 5/2000 | Sue et al. |
| 6,171,532 B1 | | 1/2001 | Sterzel |
| 6,193,001 B1 | | 2/2001 | Eyre et al. |
| 6,315,065 B1 | | 11/2001 | Yong et al. |
| 6,325,165 B1 | | 12/2001 | Eyre |
| 6,361,873 B1 | | 3/2002 | Yong et al. |
| 6,451,442 B1 | | 9/2002 | Sue et al. |
| 2002/0127384 A1 | | 9/2002 | Mulligan et al. |
| 2002/0154741 A1 | | 10/2002 | Rigali et al. |

FOREIGN PATENT DOCUMENTS

WO   WO 01/53069 A1   7/2001

OTHER PUBLICATIONS

PCT International Search Report mailed Feb. 25, 2003, (PCT/US02/38804).
PCT International Search Report mailed Feb. 28, 2003, (PCT/US02/38654).
PCT International Search Report mailed Mar. 6, 2003, (PCT/US02/38680).
T. Daxner, H.J. Böhm, and F.G. Rammerstorfer, "Mesoscopic Simulation of Inhomogeneous Metallic Foams with Respect to Energy Absorption." *Computational Materials Science 16*, pp. 61–69 (1999).

(List continued on next page.)

*Primary Examiner*—Christopher A. Fiorilla
(74) *Attorney, Agent, or Firm*—Banner & Witcoff, Ltd.

(57) ABSTRACT

Processes for mechanically fabricating two and three-dimensional fibrous monolith composites include preparing a fibrous monolith filament from a core composition of a first powder material and a boundary material of a second powder material. The filament includes a first portion of the core composition surrounded by a second portion of the boundary composition. One or more filaments are extruded through a mechanically-controlled deposition nozzle onto a working surface to create a fibrous monolith composite object. The objects may be formed directly from computer models and have complex geometries.

19 Claims, 7 Drawing Sheets

OTHER PUBLICATIONS

Mark A. Janney, Stephen D. Nunn, Claudia A. Walls, Ogbemi O. Omatete, Randy B. Ogle, Glen II. Kirby, and April D. McMillan, "Gelcasting," *The Handbook of Ceramic Engineering*.

T.J. Lu, B.A. Stone and M.F. Ashby, "Heat Transfer in Open–Cell Metal Foams," *Acta Mater.*, vol. 46, No. 10, pp. 3619–3635 (1998).

S. Santosa and T. Wierzbicki, "On the Modeling of Crush Behavior of a Closed–Cell Aluminum Foam Structure," *J. Mech. Phys. Solids*, vol. 46, No. 4, pp. 645–669 (1998).

S.P. Santosa and T. Wierzbicki, A.G. Hanssen and M. Langseth, "Experimental and Numerical Studies of Foam–Filled Sections," *International Journal of Impact Engineering 24*, pp. 509–534 (2000).

J.J. Brennan and K. M. Prewo, "Silicon Carbide Fibre Reinforced Glass–Ceramic Matrix Composites Exhibiting High Strength and Toughness," *J. Mater. Sci.*, 17 2371–83 (1982).

G. Hilmas, et al., "Fibrous Monoliths: Non –Brittle Fracture from Powder–Processed Ceramics,"0 *Mat. Sci. & Eng.* A195, 263–268 (1995).

G.E. Hilmas, et al., "SIC and $SI_3 N_4$ Fibrous Monoliths: Non–Brittle Fracture From Powder Processed Ceramics Produced by Coextrusion," vol. 61 *Ceramic Processing Science and Technology*, pp. 609–14 (1993).

H. Kodama, et al., "Silicon Carbide Monofilament–Reinforced Silicon Nitride or Silicon Carbide Matrix Composites," *J. Am. Ceram. Soc.*, 72(4) 551–56 (1989).

D. Kovar, et al., "Fibrous Monolithic Ceramics" *J. Am. Ceram. Soc.*, 80(10) 24171–2487 (1997).

P.J. Lamico, et al., "SIC/SIC Composite Ceramics," *Am. Ceram. Soc. Bull.*, 65(2) 336–38 (1988).

T.I. Mah, et al., "Recent Developments in Fiber–Reinforced High Temperature Ceramic Composites," *Am. Ceram. Soc. Bull.*, 88(2) 304–08 (1987).

K.M. Prewo, "Fiber–Reinforced Ceramics: New Opportunities for Composite Maaterials," *Am. Ceram. Soc. Bull.*, 68(2) 395–400 (1989).

K.M. Prewo and J. J. Brennan, "High–Strength Silicon Carbide Fibre–Reinforced Glass–Matrix Composite," *J. Mater. Sci.*, 16 483–88 (1980).

J.R. Strife, et al., "Status of Continuous Fiber–Reinforced Ceramic Matrix Composite Processing Technology," *Ceram. Eng. Sci. Proc.*, 11(7–8) 871–919 (1990).

\* cited by examiner

METHODS FOR PREPARATION OF THREE-DIMENSIONAL BODIES

CROSS-REFERENCE TO RELATED APPLICATIONS

This application is based on, and claims the benefit of, co-pending U.S. Provisional Application Serial No. 60/251,171, filed on Dec. 4, 2000, and entitled "Solid Freeform Fabrication Method for Fibrous Monolith Composites."

The present invention was made with U.S. Government support under grant Number DE-FC02-96CH10861, awarded by the Department of Energy, and under grant Number NAS8-00081 awarded by the National Aeronautics and Space Administration. Accordingly, the Government may have certain rights in the invention described herein.

FIELD OF THE INVENTION

The present invention relates to processes for the fabrication of two- or three-dimensional fibrous monolith (FM) composites. The invention allows articles having complex geometries to be fabricated from a single continuous fibrous monolith filament while controlling several critical processing parameters.

BACKGROUND OF INVENTION

Fibrous monoliths ("FMs") are a unique class of structural ceramics that have mechanical properties similar to continuous fiber reinforced ceramic composites (CFCCs). Such properties include relatively high fracture energies, damage tolerance, and graceful failures. In contrast to CFCCs, FMs can be produced at a significantly lower cost. FMs, which are monolithic ceramics, generally are manufactured by powder processing techniques using inexpensive raw materials. As a result of the high performance characteristics of FMs and the low costs associated with manufacture of FMs, FMs are used in a wider range of applications than heretofore typical for ceramic composites.

In preparing FM composites, starting materials typically are formed into filaments having predetermined lengths. These FM green filaments can be wound around a drum or mandrel as they are prepared to provide a desired object, or prototype, upon removal form the drum or mandrel. Other methods of forming the objects include molding, cutting and machining. Thus, in the fabrication of FM composite materials and objects, the working of the individual filaments is a labor intensive and time-consuming process.

There remains a need for a less labor-intensive process for preparing prototypes from FM composites that permits the fabrication of FM structures having complex geometries. There also remains a need for a process for preparing prototypes from FM composites to increase the production rate, reproducibility and quality of FM composite parts.

SUMMARY OF THE INVENTION

The present invention overcomes the disadvantages of prior fabrication methods. In the present invention, methods are provided for forming stronger, more durable FM prototypes. More specifically, an automated process utilizing a high pressure extruder head, which may be mechanically controlled, is utilized to extrude a continuous FM filament onto a surface, which may be mechanically controlled, to form three-dimensional objects.

In one embodiment, a computer-controlled high-pressure extrusion head with a 4-axis computer numerically controlled (CNC) motorized stage provides for extrusion and deposition of FM components. The process results in the production of solid objects directly from a computer model without part-specific tooling or human intervention. The SFF process permits the manufacture of larger, more complex parts within tighter tolerances.

DETAILED DESCRIPTION OF THE INVENTION

The present invention allows for the preparation of a wide variety of objects from FM materials. The process includes pressing a feed rod of the compounded engineering thermoplastic raw material. The feed rod is loaded into heated barrel to provide a molten material. The molten material directly feeds into a fine deposition nozzle whose volumetric flow rate can be adjusted for high raw material dispensing. The molten thermoplastic is extruded through the deposition nozzle onto a surface, such as a foam pad. The surface is mounted on a 4-axis, motorized, computer numerically controlled (CNC) platen.

The invention utilizes a software program that allows for forming of an entire composite object out of one single, continuous fiber. Laminations of 'green' parts by warm isostatic pressing process allow for objects having essentially no porosity with a surface finish of the 12-S quality.

A. Filament Preparation

As used herein, "fibrous monolithic composite" and "fibrous monolith" are intended to mean a ceramic and/or metallic composite material that includes a plurality of monolithic fibers, or filaments, each having at least a cell phase surrounded by a boundary phase but may include more than one core and/or shell phase. Fibrous monoliths exhibit the characteristic of non-brittle fracture, such that they provide for non-catastrophic failure.

As used herein, "cell phase" is intended to mean a centrally located primary material of the monolithic fiber, that is dense, relatively hard and/or strong. The cell phase extends axially through the length of the fiber, and, when the fiber is viewed in transverse cross-section, the cell phase forms the core of the fiber. The "cell phase" also may be referred to as a "cell" or "core".

As used herein, "boundary phase" is intended to mean a more ductile and/or weaker material that surrounds the cell phase of a monolithic fiber in a relatively thin layer and that is disposed between the various individual cell phases, forming a separating layer between the cell phase and surrounding cell phases when a plurality of fibers are formed in a fibrous monolithic composite. The "boundary phase" also may be referred to as a "shell," "cell boundary" or "boundary".

Fibrous monoliths ("FMs") are a unique class of structural ceramics that have mechanical properties similar to continuous fiber reinforced ceramic composites (CFCCs). Such properties include relatively high fracture energies, damage tolerance, and graceful failures. In contrast to CFCCs, FMs can be produced at a significantly lower cost. FMs, which are monolithic ceramics, generally are manufactured by powder processing techniques using inexpensive raw materials. As a result of the high performance characteristics of FMs and the low costs associated with manufacture of FMs, FMs are used in a wider range of applications than heretofore typical for ceramic composites.

Figure 1:
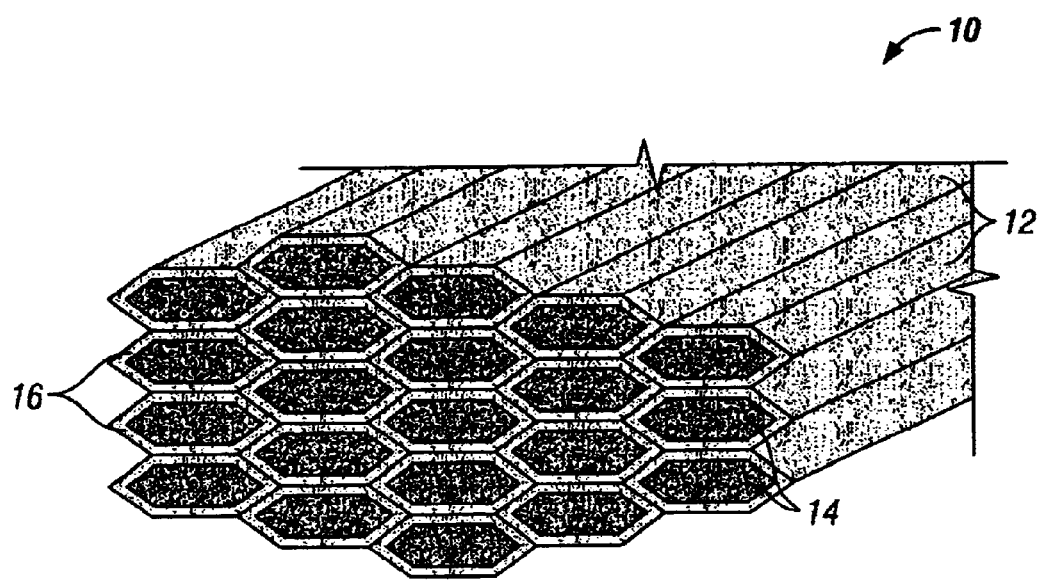
FIG. 1 is a perspective cross-sectional view of a uniaxial fibrous monolith composite in accordance with the present invention.
Figure 2:
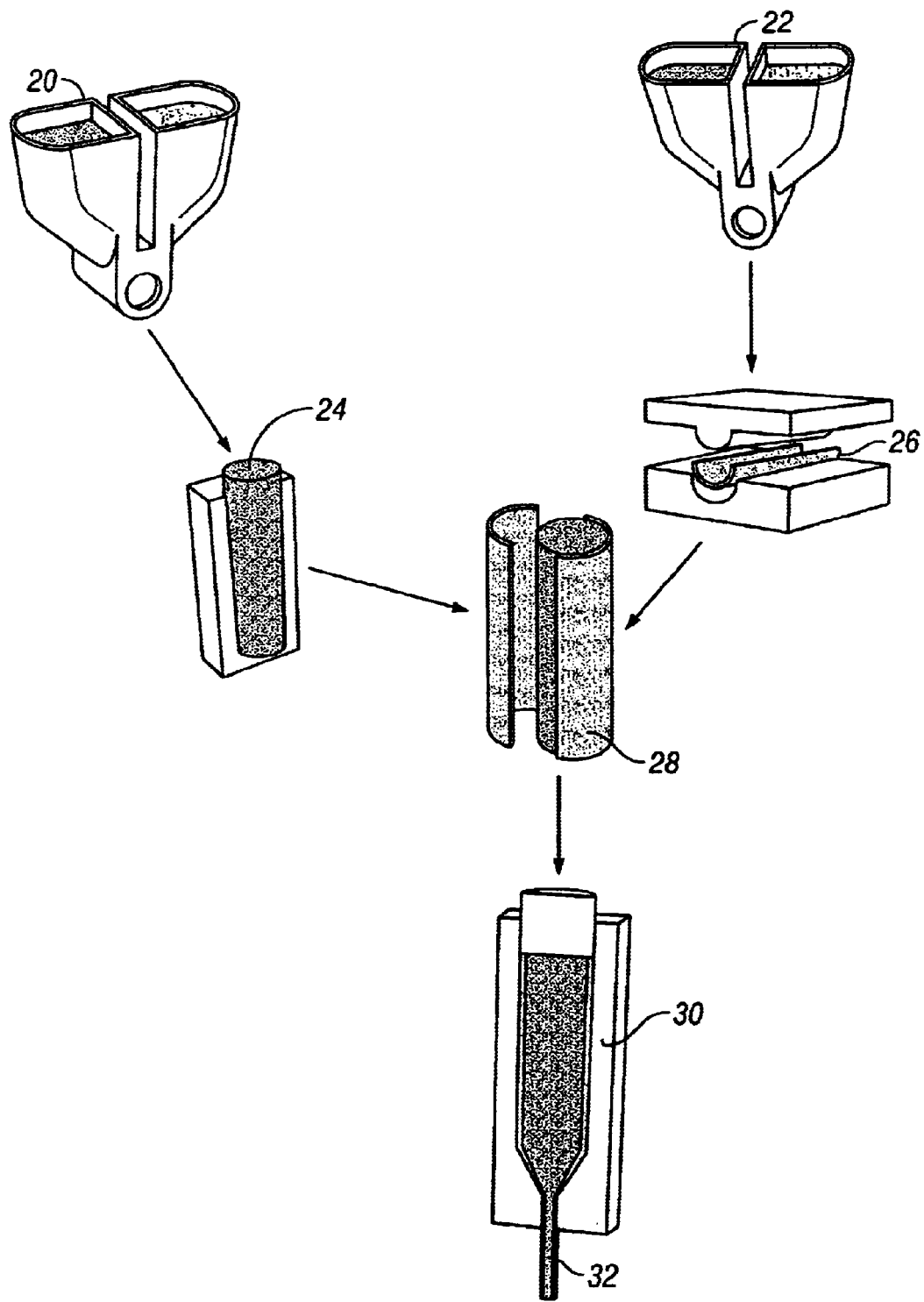
FIG. 2 is a schematic flow diagram showing a process of preparing filaments in accordance with the present invention.

As shown in FIG. 1, the macroarchitecture of an FM composite 10 generally includes multiple filaments 12 each comprising at least two distinct materials—a primary phase in the form of elongated polycrystalline cells 14 separated by a thin secondary phase in the form of cell boundaries 16. Typical volume fractions of the two phases are between about 50 to about 99% of the fiber for the primary phase (polycrystalline cell) and between about 1 to about 50% of the fiber for the interpenetrating phase (cell boundary). Preferably, the volume fractions are between about 80 to about 95% for the primary phase (polycrystalline cell) and between about 5 to about 20% for the interpenetrating phase (cell boundary). The primary or cell phase typically consists of a structural material of a metal, metal alloy, carbide, nitride, boride, oxide, phosphate or silicide and combination thereof. The cells are individually surrounded and separated by cell boundaries of a tailored secondary phase. Powders that may be used in the secondary phase include compounds to create weak interfaces such as fluoromica, and lanthanum phosphate; compounds to create porosity in a layer which function to create a weak interface; graphite powders and graphite-containing powder mixtures; and hexagonal boron nitride powder and boron nitride-containing powder mixtures. If a metallic debond phase is desired, reducible oxides of metals may be used, e.g., nickel and iron oxides, or powders of metals, e.g., nickel, iron, cobalt, tungsten, aluminum, niobium, silver, rhenium, chromium, or their alloys.

Advantageously, powders which may be used in the cell and/or boundary phase composition to provide the green matrix filament include diamond, graphite, ceramic oxides, ceramic carbides, ceramic nitrides, ceramic borides, ceramic silicides, metals, and intermetallics. Preferred powders for use in that composition include aluminum oxides, barium oxides, beryllium oxides, calcium oxides, cobalt oxides, chromium oxides, dysprosium oxides and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, hexagonal boron nitrides, hafnium nitride, silicon nitrides, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, tantalum, iridium, platinum, zirconium, palladium and other transition metals and their alloys; cerium, ytterbium and other rare earth metals and their alloys; aluminum; carbon; lead; tin; and silicon.

Compositions comprising the cell phase differ from those comprising the boundary phase in order to provide the benefits generally associated with FMs. For example, the compositions may include formulations of different compounds (e.g., HfC for the cell phase and WRe for the boundary phase or WC—Co and W—Ni—Fe) or formulations of the same compounds but in different amounts (e.g., WC-3% Co for the cell phase and WC-6% Co for the boundary phase) as long as the overall properties of the compositions are not the same. For example, the compositions can be selected so that no excessively strong bonding occurs between the two phases.

The cell boundary phase may be selected to create pressure zones, microcrack zones, ductile-phase zones, or weak debond-type interfaces in order to increase the toughness of the composite. For example, low-shear-strength materials such as graphite and hexagonal boron nitride make excellent weak debond-type cell boundaries and are present in $Si_3N_4$/BN and SiC/Graphite FM composites. The weak BN and graphite interfaces deflect cracks and delaminate thereby preventing brittle failure of these composites and increasing their fracture toughness. As a result, FM structures exhibit fracture behavior similar to CFCCs, such as C/C and SiC/SiC composites, including the ability to fail in a non-catastrophic manner.

Figure 3:
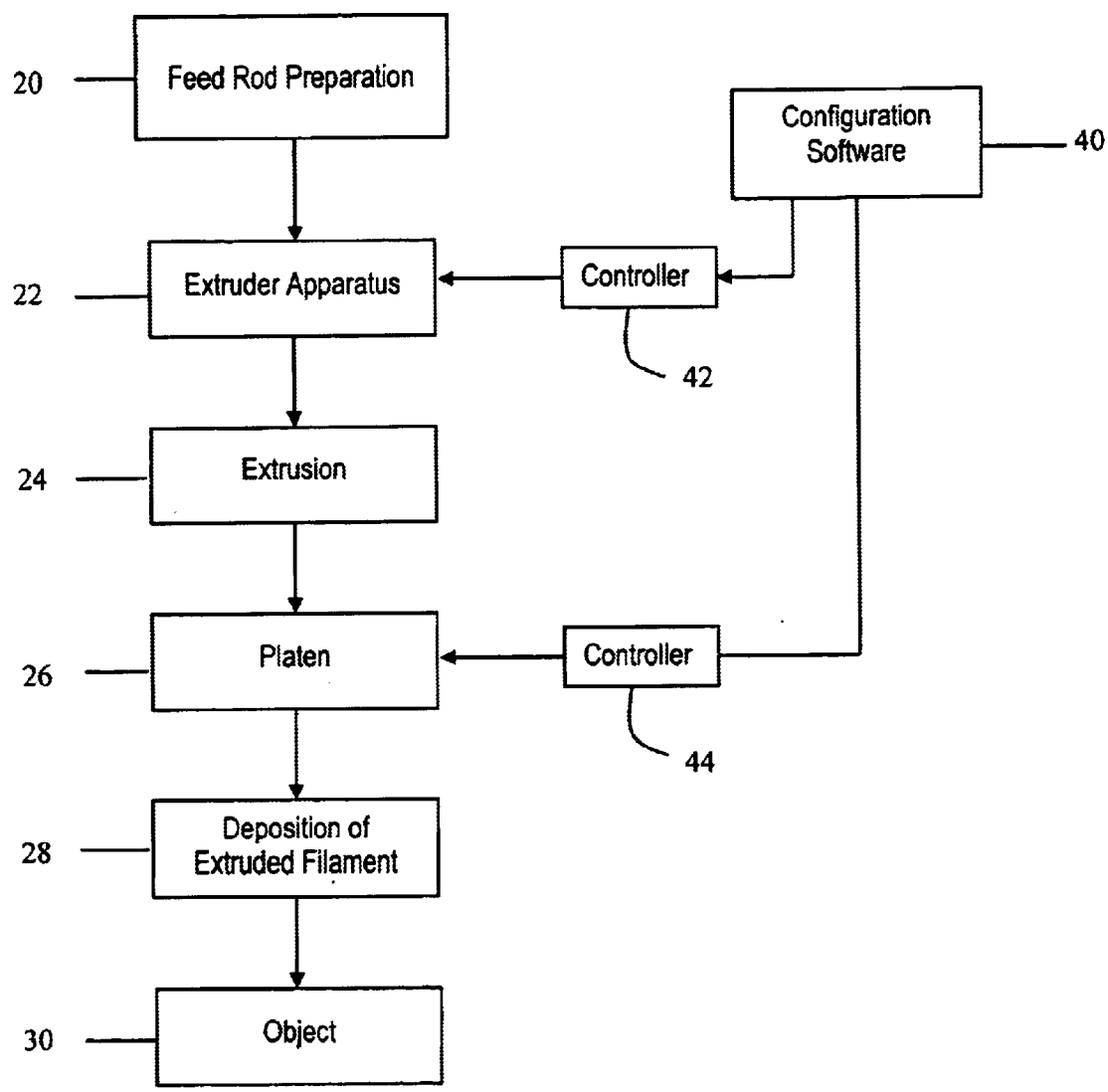
FIG. 3 is a block flow diagram showing a process for further preparing the filaments of FIG. 2.

Various methods of preparing fibrous monolithic filaments are known in the art, including the methods disclosed in U.S. Pat. No. 5,645,781, which is incorporated by reference herein in its entirety. Generally, as illustrated in FIG. 3, the process of preparing fibrous monolithic filaments in accordance with the present invention includes separately blending the starting materials for a core 20 and shell 22, forming the core 24 having a first composition and forming the shell 26 having a second composition, forming the feed rod 28 from the core and shell, and extruding the feed rod 30 one or more times to provide a ceramic filament 32. The filaments may then be formed and/or arranged to provide the desired structure in accordance with the present invention.

Fibrous monolith composites are fabricated using commercially available ceramic and metal powders using a process for converting ordinary ceramic powder into a "green" fiber that include the powder, a thermoplastic polymer binder and other processing aids. The fiber is compacted into the "green" state to create the fabric of elongated polycrystalline cells that resemble a fiber after sintering or hot pressing. The process is widely applicable, and allows a cell/cell boundary bi-component fiber to be made from a thermodynamically compatible set of materials available as sinterable powders. The scale of the microstructure is determined by the green fiber diameter (cell size) and coating thickness (cell boundary). Once the green composite fiber is prepared, it can be formed into a desired object using the methods of the present invention.

The core and shell of the feed rod are formed of mechanically activated and agglomerate-free powders. The powders, such as the metals, alloys, carbides, nitrides, borides, oxides and silicides listed above, are selected to provide the desired mechanical properties in the final composite. A wide variety of combinations of powders may be used for the core and shell materials. Powders having particle size distributions in the range of about 0.01 to about 100 microns ($\mu m$) in size may be used. Preferably, the particle size of the powder is between about 1 to about 10 microns.

Filaments having more than one cell composition and/or more than one shell composition can also be prepared to provide the benefits of the properties of the additional composition and/or to insulate the shell material. As an example, a layer of a second cell composition may be disposed around the shell, such that the filament includes a central cell, an intermediate shell and an outer cell. Other combinations of cells and shells also may be prepared as desired. For example, a core material in combination with a plurality of different shells may be used.

Figure 4:
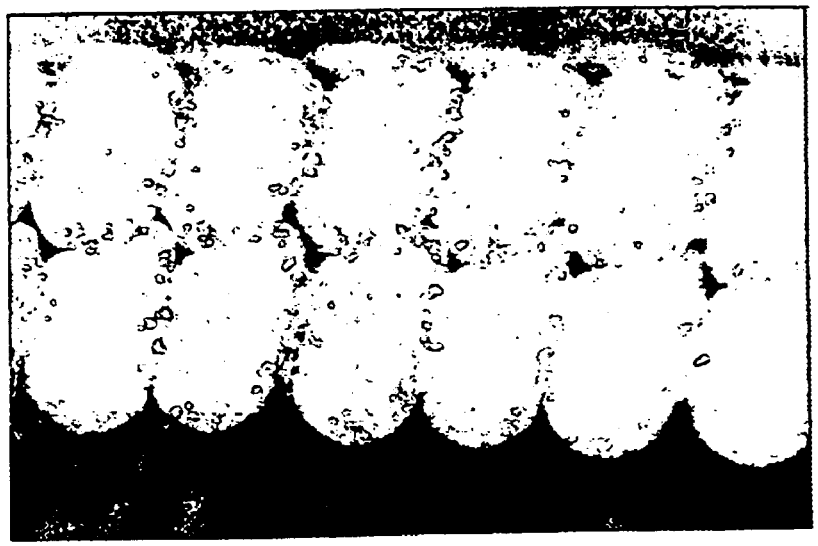
FIG. 4 is a photomicrograph of an axial cross-section of an FM composite prepared by the process of FIG. 3.

A plurality of filaments may be bundled together and disposed within another shell. This arrangement of filaments results in essentially a "honeycomb" configuration when arranged to form the FM composite, as shown in FIG. 4. The bundled arrangement maintains the mechanical behavior of the filaments but insulates a "weaker" shell material from the external environment and any harsh conditions.

Numerous modifications and adjustments to the process for preparing filaments may be made to allow for variations in the particular compositions used to prepare the filaments. For example, viscosities may be adjusted, the diameter of the extrusion die may be changed, or the relative volumes of the core and shell may be changed. Other methods for extruding the filaments known to those of skill in the art also may be utilized in combination with the processes and apparatus of the invention. For example, any modified process for continuous co-extrusion may be used.

Although the invention is described with reference to generally cylindrical-shaped FM filaments that are bundled together to form FM composites wherein the shape of the filaments become essentially hexagonal in cross-section as a result of processing, other configurations are contemplated, as will be appreciated by those skilled in the art. For example, filaments having square, rectangular or triangular cross-sections may be obtained by varying the shape of the extrusion die accordingly. Additionally, the shape of the die used in the laminating step also may be modified accordingly as desired. Thus, different shapes and configurations of filaments in the FM composite may be obtained, which may impact the resultant mechanical properties of the FM composite.

A binder burnout furnace, such as commercially available from Lindberg, Watertown, Wis. is used to remove polymer binder from the formed composite coatings and FM composite structures. Sintering processes, including hot pressing, hot isostatic pressing or pressureless sintering, provide final consolidation and densification of the composite coatings and FM composite structures. A typical induction hot-press such as commercially available from Vacuum Industries, Somerville, Mass. is capable of a maximum temperature of 2400° C. and a maximum load of 100 tons and can be operated in several different environments including vacuum, argon, and nitrogen atmospheres.

B. Filament Deposition Process

Referring now to FIG. 3, the process of the present invention generally includes preparation of FM feed rods 20 and further processing of the feed rods in an apparatus that includes an extrusion mechanism 22 for extruding 24 the filament and a platen 26 onto which the extruded filament is deposited 28 in forming the desired object 30. The extrusion mechanism and/or the platen may be mechanically controlled 42, 44 using a software program 40 in order to direct the filament as it is deposited onto the platen. The extrusion mechanism includes a gantry for the extrusion head, a motorized 4-axis stage, and a motion control system.

Figure 6:
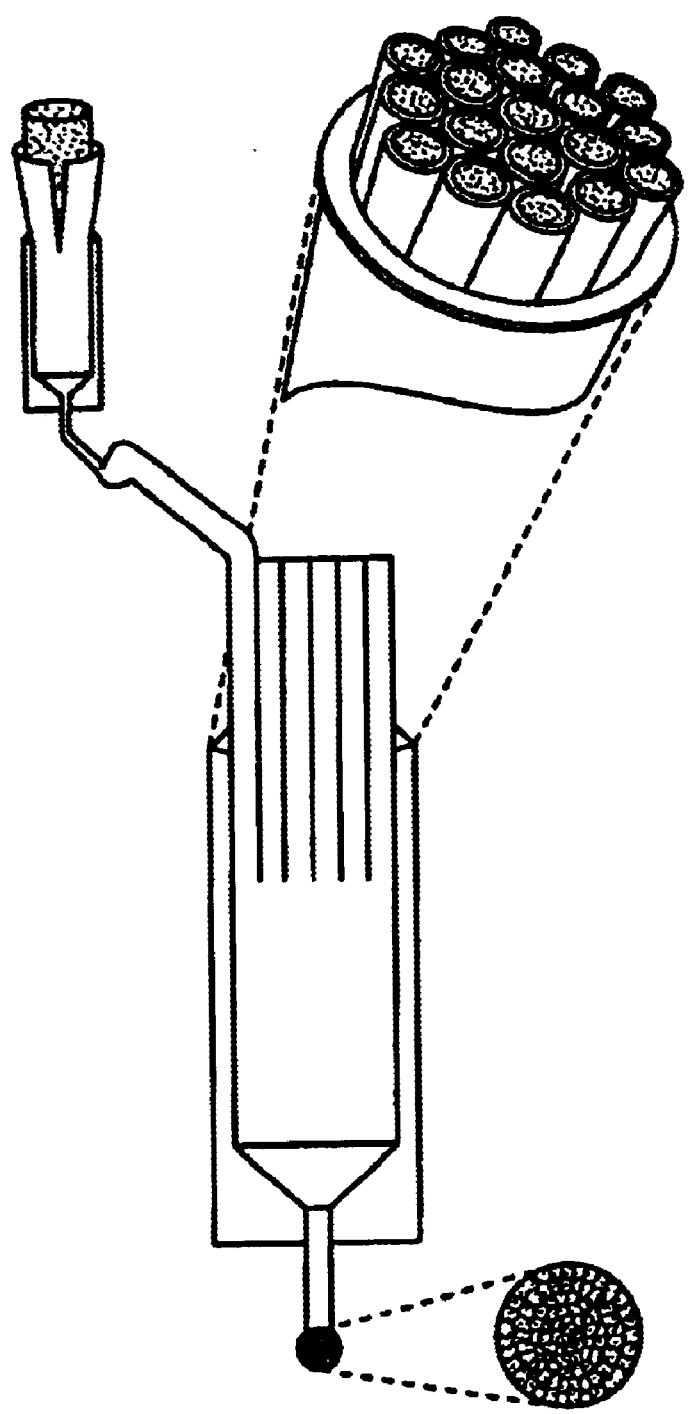
FIG. 6 is a schematic illustration of an apparatus of the process of FIG. 3, showing extrusion of a plurality of FM filaments.
Figure 7:
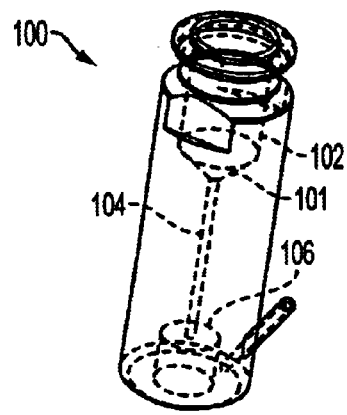
FIG. 7 is a perspective view of the apparatus of FIG. 6.
Figure 8:
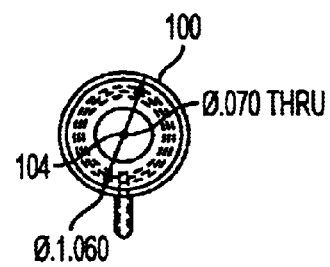
FIG. 8 is a cross-sectional end view of the apparatus of FIG. 7.
Figure 9:
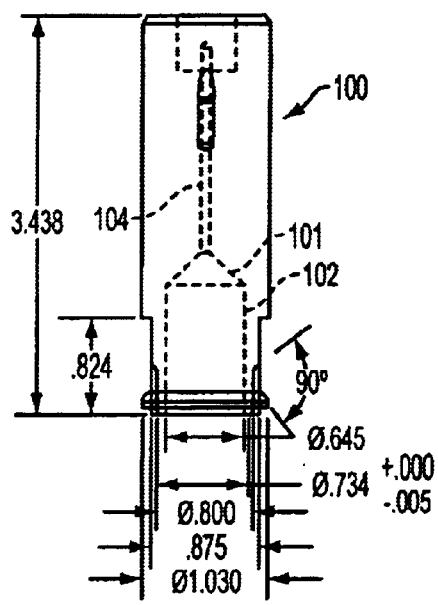
FIG. 9 is a front elevational view of the apparatus of FIG. 7.
Figure 10:
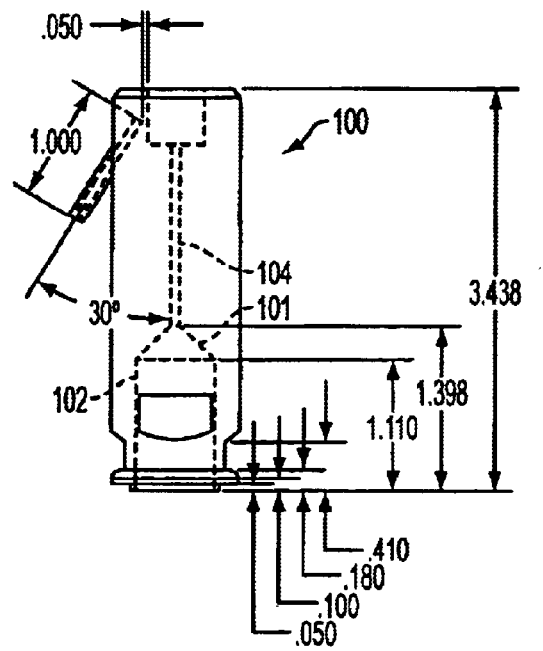
FIG. 10 is a front elevational view of the apparatus of FIG. 7.

Multifilament feed rod 10 also may be used, and the feed rods passed to the extrusion mechanism 22, as illustrated in FIG. 6. The multifilament feed rods are prepared by bundling a plurality of FM filaments of predetermined length, encasing the bundle within an outer shell, if desired, and pressing the filaments into a feed rod. Additional volume reduction of the FM filaments is provided as a result of the FM filaments being extruded twice, once during preparation of the filaments from the starting materials and again during the extrusion/formation process, particularly where a plug of bundled filaments is utilized. Additionally, multifilament feed rods allow filaments having smaller cross-sectional diameters to be prepared.

The extruded filament is deposited on a surface of the platen located below the extruder head. The FM filament is deposited to form the desired shape of an object, with the axis of the filament being deposited generally parallel to the surface of the platen. The extruder head and/or the platen may be mechanically controlled to direct the extruded filament into the desired shape.

EXAMPLE 1

Motion Architect Program to Fabricate "Green" FM Components

The process of the present invention utilizes a motion architect program for building FM composite parts. For the design and the optimization of the motion architect program, 'green' 3 mm×4 mm×55 mm test bars and 3"×3" coupons and a thruster of complex geometry were built. Consolidation parameters, which resulted in fully dense parts by hot pressing, were established. Hot isostatic press (HIP) parameters were also determined. Room and elevated temperature flexure and tensile testing evaluated the thermo-mechanical properties of the coupons and test bars.

In this example, the motion architect program was designed for building a 'green' rocket thruster. Two methods were evaluated to create the architecture program. First, a commercially available computer software program was used to generate the architect program for the rocket thruster. The commercial software program separates the drawing of the rocket thruster into individual slices and further into straight lines. From there, the X, Y, and Z locations for the extrusion are extracted. The software program outputs code in a machine language which is then stripped of all machine specific commands, leaving the basic coordinates as a base for a motion architect language program—the language of the SFF machine. The scale between one machine-unit and one SFF-unit is determined and introduced into the motion architect program. The relation between one machine-unit and one SFF unit is 20:1. Also, SFF specific commands are introduced to control the parameters as described in Table 1.

TABLE 1

| Parameter | Description |
| --- | --- |
| Start delay | The lag time between layers |
| Pre-flow | Extrusion rate during stops |
| Start flow | Extrusion rate at the start of the exit distance |
| Start distance | Distance from start point for main flow to start |

TABLE 1-continued

| Parameter | Description |
|---|---|
| Main flow | Extrusion rate over the bulk of the layer |
| Shutoff distance | The distance from the stop point for main flow to stop |
| Rollback | The rate the material is pulled back to reduce the flow |
| Speed | The rate at which the head moves along a set path |
| Acceleration | The rate at which the extrusion head changes speed |

In addition, various other parameters were optimized to obtain a fully dense part that is within dimensional tolerances with an acceptable surface finish. These parameters include the thickness of the slices, lateral distance of the filament during the extrusion process, path velocity, extrusion speed, and the extrusion nozzle diameter and geometry. Known literature can serve as a useful guide to understanding the influence of the different parameters on the finished object to assist with optimizing operating parameters.

The first approach of using a commercially available software program to generate the program did not deliver optimal results. Optimal results were not achieved because typical commercially available software programs were capable of producing only straight moves. Most motion architecture programs typically have very complex features and tend to be very lengthy. Consequently, large amounts of individual segments must be downloaded from the personal computer to the motion controller. Because of the large amount of downloading required, the motion of the nozzle stopped after each segment, but extrusion of the material continued. As a result, heaps of excess material formed and bulges in the finished part occurred. The extrusion nozzle must be kept moving. To keep the nozzle moving, the parameters of Table 1 were introduced.

A second approach to creating the motion architecture program was utilized. The program was written line by line. Writing the program line by line results in a shortened code since precompiled routines are used. Consequently, the parameters of Table 1. were eliminated in the new code making it possible to build an entire part out of one single fiber. To determine the ideal path velocity, extrusion speed, lateral distance between paths and slice thickness, samples of cylinders were extruded.

EXAMPLE 2

Optimization of Operating Parameters a. Test Billet Production

Initially, three 3"×3" billets were produced and tested. Table 2 lists the fabrication parameters and the material properties of the consolidated billets. The flexural strength of the uniaxial billets built by traditional hand layup was 60% of the strength of monolithic ZrC (60 ksi) and was typical of FM composites. However, the test bars failed catastrophically with no load retention after initial failure that is atypical of FM composites. An explanation for this behavior was found in the billets, within which, upon examination, several small surface cracks were distinguishable. These cracks correspond to areas in the billet where the W/Re interface was not uniformly distributed and discontinuous. A discontinuous WRe interface can result in poor composite behavior during testing. The viscosity of the ceramic/thermoplastic and metal/thermoplastic mixtures by reformulating the recipes.

TABLE 2

| Hot Press Run 489/Billet Material Characteristics | 1 | 2 | 3 |
|---|---|---|---|
| Material | ZrC(10%SiC)/WRe-HfC | ZrC(10%SiC)/WRe-HfC | ZrC(10%SiC)/WRe-HfC |
| Architecture | Uniaxial MFCX* 12 Layers | Uniaxial SFCX 16 Layers | Biaxial MFCX* 12 Layers |
| Layup | Hand Layup | SFF | Hand Layup |
| Laminating Data |  |  |  |
| Green Weight | 214.00 g | 202.00 g | 238.42 g |
| Laminating Temperature | 140° C. | 140° C. | 140° C. |
| Laminating Pressure | 30,000 psi | 30,000 psi | 30,000 psi |
| Hot Pressing |  |  |  |
| Set Point | 1950° C. | 1950° C. | 1950° C. |
| Atmosphere | $N_2$ | $N_2$ | $N_2$ |
| Soak Time | 1 hr | 1 hr | 1 hr |
| Pressure | 4000 psi | 4000 psi | 4000 psi |
| Material Properties |  |  |  |
| Flexural Strength (ksi) | 33.91 | 9.62 | 26.28 |

The first rapid prototyped billet exhibited low flexural strength in comparison to the billets built by hand. However, the load-displacement curve of one of the test bars revealed FM composite behavior in failure. Optimization of the SFF extrusion parameters and viscosity matching of the ZrC core/WRe interface lead to improved strength and composite behavior of the billet and components fabricated by this process.

b. Optimization of ZrC and WRe Recipes

As described above, FM feed rods are two component systems consisting of a primary core material and a secondary shell material. When individually mixing these components in preparation for co-extrusion, the torque on a C. W. Brabender Plasti-Corder Torque Rheometer is measured. Typically, the torque measurement of the core material must be between 10% to 20% higher than the shell material. When the torque of the core material is not between 10% to 20% higher than the shell material, a uniform co-extruded filament will not be obtained.

Using a conventional extruder, no filament extrusion problems were observed with the initial ZrC/thermoplastic and WRe/thermoplastic recipes. However, when the same recipes were used with the apparatus and method described herein, various problems with the extrusion, were observed, including no shell material being extruded, inconsistent extrusions where the shell material is extruded in waves, and extrusions where the shell material blends into the core material. The formulations for the filaments were adjusted to address such problems. Several iterations led to the recipes and the improved formulations listed in Tables 3 and 4. In the ZrC recipe, Luwax, a hydrocarbon wax used in the old recipe, was replaced by the higher melt flow index EEA binder to reduce the viscosity of the core material. This required a similar adjustment to the WRe interface material to achieve viscosity matching during co-extrusion.

TABLE 3

New ZrC-Recipe

| Type | ZrC 'Core' material | | | |
|---|---|---|---|---|
| Batch Size | 42 | | Cc | |
| Batching Temperature | 150 | | Deg C | |
| Batching Speed | 60 | | Rpm | |
| Material | Density (g/cc) | Volume % | Volume (cc) | weight (g) |
| ZrC (10% SiC) | 6.350 | 48.00 | 20.16 | 128.02 |
| EEA (MFI 20) | 0.930 | 21.00 | 8.82 | 8.20 |
| EVA | 0.940 | 21.00 | 8.82 | 8.29 |
| Butyl Oleate | 0.873 | 10.00 | 4.2 | 3.67 |
| | 3.528 | 100.00 | 42.00 | 148.18 |

TABLE 4

New WRe-Recipe

| Type | WRe 'Shell' material | | | |
|---|---|---|---|---|
| Batch Size | 42 | | Cc | |
| Batching Temperature | 150 | | Deg C | |
| Batching Speed | 60 | | Rpm | |
| Material | Density (g/cc) | Volume % | Volume (cc) | Weight (g) |
| W,Re,HfC | 19.300 | 52.63 | 22.10 | 426.62 |
| EEA (MFI 20) | 0.930 | 27.37 | 11.50 | 10.69 |
| EEA (MFI 1.5) | 0.930 | 20.00 | 8.40 | 7.81 |
| | | 100.00 | 42.00 | 445.12 | c. Nozzle Geometry

A modified nozzle geometry is necessary to facilitate the material flow through the heating chamber and the extrusion compartment. The nozzle apparatus is shown in FIGS. 6–10. Generally, the nozzle 100 includes a feed chamber 102 having a frustoconical portion 101 into which the filament feed rod is initially fed. The chamber 102 feeds into an extrusion chamber 104 having a predetermined cross-sectional area for extruding the filaments. A nozzle tip (not shown) is attached to the end 106 of the extrusion chamber 104 opposite the chamber 102. The filament is fed from the nozzle tip onto the surface of the platen.

Figure 11:
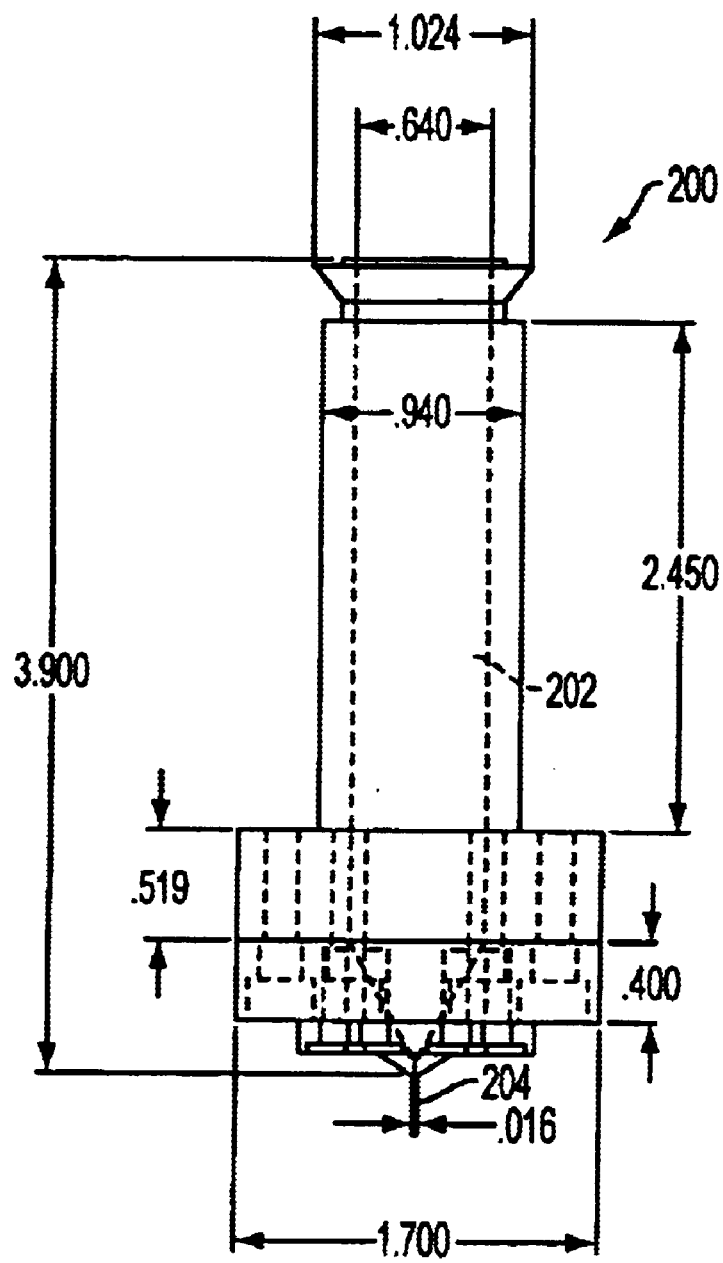
FIG. 11 is a front elevational view of a second apparatus in accordance with the present invention.

Another embodiment of a nozzle apparatus 200 is shown in FIG. 11. Among other differences, the feed chamber 202 is longer and the extrusion chamber 204 is shorter than those of the nozzle apparatus of FIGS. 7–10.

d. Build Speed

The build speed does not have a significant influence on the outcome of the finished "green" part. Tests were run at 6000, 4000, and 1000 steps per minute. All the parts were acceptable from an extrusion point of view. However, at 6000 steps per minute some steps are lost because of the inertia of the machine, slow electronics, and other specific characteristics of this system such as running without feedback. As result, distortion of the part occurs. Consequently, a build speed of 4000 steps/minute is preferred.

e. Extrusion Speed

Cylinders were extruded to determine the ideal extrusion speed and slice thickness. One cylinder was extruded with an extrusion speed of 0.32 times the path velocity; slice thickness was 0.013". A bulge in the resultant cylinder indicated that the extrusion speed was too high and the slice thickness too small. A second sample was extruded at 0.2 and 0.016" slice thickness. Visible irregularities occurred, indicating that there was not enough material extruded, causing voids and therefore irregularities in the part. Refining software code and adapting the extrusion nozzle geometry and diameter can eliminate these discrepancies.

A third sample was acceptable. The sample was extruded at 0.25 and the slice thickness was 0.016". Measurements of this same are presented in Table 5.

TABLE 5

| Dimension | Theoretical | Actual |
|---|---|---|
| Wall thickness | 0.032" | 0.053" |
| Height | 0.280" | 0.277" |
| Outer diameter | 0.500" | 0.545" |
| Inner diameter | 0.468" | 0.400" | f. Extrusion Temperature

The preferred extrusion temperature is 143° C. One test was run at 130° C. resulting in high extrusion pressures and virtually no improvement in the lay up of the part. In a second test, the temperature was set to 155° C., but this test also yielded poor results and no improvement in the part's extrusion. High extrusion temperatures and high extrusion pressure expose the equipment to unnecessary strain, therefore 143° C. appears to be the preferred extrusion temperature for this material/binder system.

g. Minimize Pore Volume

Figure 5:
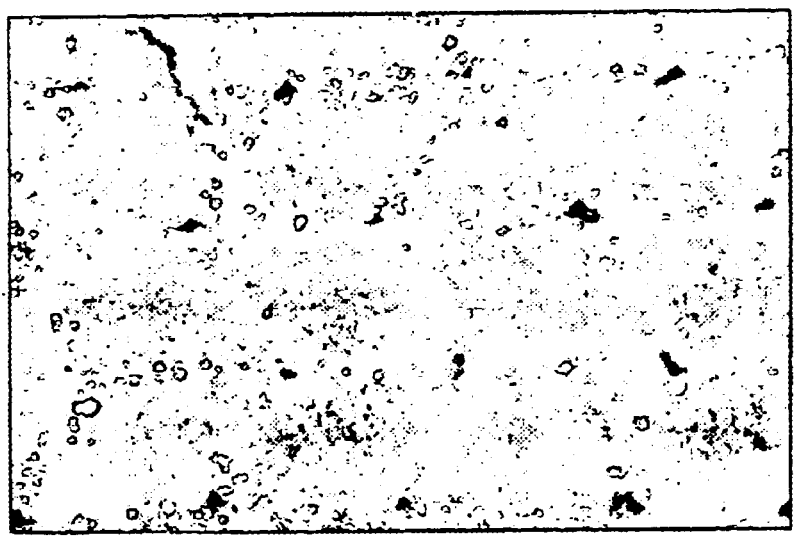
FIG. 5 is a photomicrograph of an axial cross-section of a second FM composite prepared by the process of FIG. 3.

Increasing the extrusion speed results in reduced pore volumes. The extruded material presses into the open space between the filaments and reduces the pore volume between the extruded filaments. However, as seen in FIGS. 4 and 5, some residual porosity between the filaments results even with the increased extrusion speed. Warm isostatic pressing (WIP) process eliminates virtually all of the pores, thereby improving the consolidating process and facilitating the handling of the parts in the green and brown state of the manufacturing cycle. FIGS. 4 and 5 also illustrate the consistency with which the extrusion process deposits the core and shell material. The lighter areas around the circumference of the individual fibers represent the shell material.

EXAMPLE 3

Warm Isostatic Pressing (WIP)

FIGS. 4 and 5 show that even in the ideal extrusion, some residual porosity occurs. Because fully dense components are desired, a 'green' lamination process is utilized to minimize or eliminate this residual porosity from 'green' processing. Such a lamination process can be rather complicated when eliminating green porosity in components due, in part, to the difficulty in design and fabrication of a laminating die.

One solution is to avoid a laminating die using a warm isostatic laminating process (WIP), which includes placing a component in a pressure vessel. The vessel is sealed and heated to the required laminating temperature, in this example 140° C., and an inert gas, such as nitrogen or argon, or fluid, such as oil, is used as the compressing medium. When pressing tubes, nozzles, thrusters and other hollow components, a laminating mandrel is required to maintain the inner wall geometry of the component. For example a water soluble mandrel material such as described in U.S. Pat. No. 6,070,107 can be used. Ideally, a polymer-based mandrel material that can be poured into the hollow cavity of a green part and hardens upon drying is used.

One sample laminated was using a WIP process at 100° C. and an initial pressure of 100 psi. The pressure in the hot state reached 125 psi and the compressing medium was air. No pores were observed. In order to prevent the compressing medium from penetrating the pores, the water soluble mandrel is compressed in an evacuated and hermetically sealed polymer bladder. If the compressing medium penetrates the pores, no compression of the pores will occur.

Besides eliminating pores, WIP can be used to improve the surface finish. The improvement of the finish depends mainly on the stiffness of the polymer bladder. If the material is very soft, it conforms to even the slightest inconsistencies of the surface, for example the ridges in between individual filaments. Utilizing the correct bladder material resulted in an improvement of the surface finish from a 50-S to a 12-S quality on the green part.

EXAMPLE 4

Additional Co-Extrusion Experiments

An 84%/16% composition was difficult to extrude since the average particle size of the WRe is fairly coarse. Coarse W and Re grains cause the interface to pinch out during co-extrusion resulting in a discontinuous interface. This problem is addressed by using interface material with an increased volume ratio of 31%. A 69%/31% mix proved to be extrudable, producing a continuous WRe interface. To achieve this result, the milling time of the WRe powder is increased to reduce the average particle size. Milling time of WRe powder was increased from 24 hours to 48 hours.

EXAMPLE 5

Binder Burnout Experiments

Thermoplastic components (EEA) bind the ceramics and metal particles and facilitate the modeling and shaping of parts. During binder burnout the thermoplastic material is removed from the rest of the system leaving only ceramic or metal components.

The following parameters yielded the best results. The samples are packed in a graphite powder bed within a graphite crucible. Nitrogen is the preferred environment for this process. The burnout program stretches over 48 hours ramping from room temperature to 300° C. at 50° C./hr, soaking for one hour, ramping up to 650° C. at a rate of 10° C./hr, soaking for one hour and cooling for 6 hours.

The parts are transferred to a sintering furnace after the burnout process.

EXAMPLE 6

Hot Press, Sintering, and Sinter-HIP Experiments

The hot press conditions for the consolidation/densification of ZrC were established. Fully dense ZrC composites can be obtained by using 10 wt % SiC as a sintering aid, and hot pressing at 1950° C., 3.3 Ksi pressure. The ZrC/WRe composites fabricated were consolidated using these conditions. While these conditions produced good composite ZrC/WRe billets, other alternative densification/consolidation methods were explored because of the limitations of the uniaxial hot press in densifying more complicated three-dimensional components such as a thruster nozzle. Alternative methods of consolidation such as sintering and hot isostatic pressing (HIP) techniques were explored (Table 6) to establish consolidation conditions for more complicated three-dimensional components such as bladed discs, nozzles and thrusters.

TABLE 6

| Run ID# | Sample | Temperature | Atmosphere | Furnace | Result |
| --- | --- | --- | --- | --- | --- |
| HP489 | Uniaxial | 1950° C. | $N_2$ 4.4 ksi | Hot press | Listed in Table 2. |
| HP489 | Biaxial | 1950° C. | $N_2$ 4.4 ksi | Hot press | Listed in Table 2. |
| HP489 | Uniaxial SFF | 1950° C. | $N_2$ 4.4 ksi | Hot press | Listed in Table 2. |
| HP502 | Uniaxial SFF | 1950° C. | $N_2$ 4.4 ksi | Hot press | Broke before test |
| HP509 | Uni. MFCX 2x1 | 1950° C. | $N_2$ 4.4 ksi | Hot press | Not Tested |

TABLE 6-continued

| Run ID# | Sample | Temperature | Atmosphere | Furnace | Result |
|---|---|---|---|---|---|
| HP521 | Uni. MFCX 2x2 | 1950° C. | $N_2$ 4.4 ksi | Hot press | |
| HP522 | Uniaxial 69/31 | 1950° C. | $N_2$ 4.4 ksi | Hot press | |
| HP522 | Uniaxial 69/31 | 1950° C. | $N_2$ 4.4 ksi | Hot press | Not Tested |
| HP529 | Uni. MFCX 2x2 | 1950° C. | $N_2$ 4.4 ksi | Hot press | Not Tested |

Results of the sintering experiments are shown in Table 7. Relatively high densities are achieved by sintering of both monolithic ZrC and ZrC/WRe FM composite samples. All samples were placed in graphite crucibles and heated to temperature in a graphite furnace in an argon atmosphere.

The following sintering schedule was used for the monolithic samples:

Room Temperature to 1200° C. at 25° C./min

1200° C.–2000° C. at 3.3° C./min

Hold at 2000° C. for 120 min

2000° C.–1000° C. at 10° C./min

1000° C.—Room Temperature

The ZrC/WRe sample was sintered at 2000° C., but for only one hour. Microscopic and SEM examinations indicated that the porosity in both samples was mainly closed. Therefore, HIP processing of the samples will produce parts at or very close to fully dense. This result indicates that HIP conditions were established for this materials system.

Using the predetermined sintering parameters, several experiments in an Astro graphite furnace were conducted. Initial tests were conducted on burnt-out nozzles in BN powder beds. The outcome of the BN bedded samples suggested that the very weak burnt-out structures needed even more support, which led to a slight consolidation of the powder support bed. In addition, to prevent delamination and distortion, a slower heating ramp and overpressure was applied during the consolidation process. Table 8 lists the sintering experiments.

TABLE 7

| Conditions | Results |
|---|---|
| Free standing, $N_2$, non-wipped | Poorly laminated |
| Free standing, $N_2$, wipped | Delamination improved |
| BN powder imbedded | Delamination improved further |
| BN compacted powder bed | Improved deformation of nozzle geometry |
| BN compacted powder bed wipped | Improved bloating problems stemming form burnout |

TABLE 8

| Sample | Sintering Temperature (° C.) | Theoretical Density | Density (g/cc) | % Theoretical |
|---|---|---|---|---|
| ZrC(5%HCS SiC) | 2000 | 6.52 | 5.71 | 88 |
| ZrC(10%HCS SiC) | 2000 | 6.35 | 5.57 | 88 |
| ZrC(15%HCS SiC) | 2000 | 6.18 | 5.50 | 89 |
| ZrC(20%HCS SiC) | 2000 | 6.00 | 5.60 | 93 |
| ZrC(15%PC SiC) | 2000 | 5.83 | 5.44 | 88 |
| ZrC(10% Zr) | 2000 | | 5.00 | 75 |
| ZrC(5%HCS SiC) | 1950 | 6.52 | 5.13 | 79 |
| ZrC(10%HCS SiC) | 1950 | 6.35 | 5.01 | 79 |

A scanning electron photomicrograph of sintered ZrC/WRe slightly rounded cell boundaries as compared to the more hexagonal cells in the hot pressed ZrC/WRe. Porosity was not evident in the hot pressed sample.

EXAMPLE 7

Raw Materials

The following are the raw materials that were used.

| Product | Manufacturer | Article No. | Quality |
|---|---|---|---|
| ZrC | Cerac | Z-1034 | −325 mesh |
| W | Cerac | T-1220 | −325 mesh |
| R | Cerac | R-1000 | −325 mesh |
| HfC | Cerac | H-1004 | −325 mesh |
| EEA | Union Carbide | | MFL 20 |
| EEA | Union Carbide | | MFL 1.5 |
| EVA | Union Carbide | | |
| Butyl Oleate | Union Camp | | |

The processing of these materials is crucial for the successful extrusion of the parts. Milling time of the metal components proved to be of crucial importance. Milling time was increased from 24 to 48 hours. In addition, torques of the different materials, measured during the blending of the components, must result in a ratio of 0.8 to 0.9 (dividing the core material torque by the shell material torque). To achieve this ratio the recipes of the materials were adjusted, as listed in Tables 3 and 4. The preferred ratio of core/shell material was established at 69% and 31% respectively.

EXAMPLE 8

Results of Experiments

The preferred extrusion parameters are as follows:

| Build Speed: | 4000 steps/min |
|---|---|
| Extrusion Speed: | 0.25 × Build Speed |
| Extrusion Temperature: | 143° C. |
| Slice thickness: | 0.016" |

In other embodiments, alternative methods of preparing FM filaments and composite materials may be utilized. Alternative compositions and methods, including those described in the co-pending U.S. patent applications listed in Table 9, which are incorporated by reference herein in their entireties, are contemplated for use with the present invention.

TABLE 9

| TITLE | INVENTORS | FILING DATE | ATTY DOCKET NO. |
|---|---|---|---|
| ALIGNED COMPOSITE STRUCTURES FOR MITIGATION OF IMPACT DAMAGE AND RESISTANCE TO WEAR IN DYNAMIC ENVIRONMENTS | Anthony C. Mulligan Mark J. Rigali Manish P. Sutaria Dragan Popovich | Dec. 04, 2001 | 03248.00038 |
| CONSOLIDATION AND DENSIFICATION METHODS FOR FIBROUS MONOLITH PROCESSING | Manish P. Sutaria Mark J. Rigali Ronald A. Cipriani Gregory J. Artz Anthony C. Mulligan | Dec. 04, 2001 | 03248.00039 |
| COMPOSITE STRUCTURES FOR USE IN HIGH TEMPERATURE APPLICATIONS | Mark J. Rigali Manish P. Sutaria Greg E. Hilmas Anthony C. Mulligan Marlene Platero-AllRunner Mark M. Opeka | Dec. 04, 2001 | 03248.00043 |
| COMPOSITIONS AND METHODS FOR PREPARING MULTIPLE-COMPONENT COMPOSITE MATERIALS | Mark J. Rigali Manish P. Sutaria Felix Gafner Ron Cipriani Randy Egner Randy C. Cook | Dec. 04, 2001 | 03248.00044 |
| MULTI-FUNCTIONAL COMPOSITE STRUCTURES | Anthony C. Mulligan John Halloran Dragan Popovich Mark J. Rigali Manish P. Sutaria K. Ranji Vaidyanathan Michael L. Fulcher Kenneth L. Knittel | Dec. 04, 2001 | 03248.00045 |

Numerous modifications to the invention are possible to further improve the processing of fibrous monolith composites. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:

1. A process for fabricating a green fibrous monolith composite article comprising:

combining a first powder with a thermoplastic polymer binder to create a uniformly suspended first composition, combining a second powder with a thermoplastic polymer binder to create a uniformly suspended second composition, forming the first and second uniformly suspended compositions to create a feed rod having a first portion of the first composition surrounded by a second portion of the second composition; and extruding the feed rod through a deposition nozzle onto a surface in a directed orientation by mechanically manipulating at least one of the deposition nozzle and the surface to form a green fibrous monolith composite article.

2. The process of claim 1 wherein the first and second powders are selected from the group consisting of metal, metal alloy, carbide, nitride, boride, oxide, phosphate and silicide.

3. The process of claim 1 wherein the volume fraction of the first portion is between about 50 to about 99% and wherein the volume fraction of the second portion is between about 1 to about 50%.

4. The process of claim 3 wherein the volume fraction of the first portion is between about 80 to about 95% and wherein the volume fraction of the second portion is between about 5 to about 20%.

5. The process of claim 1 wherein the green fibrous monolith composite article is formed of a continuous fibrous monolith feed rod.

6. The process of claim 1 wherein the deposition nozzle includes an extrusion head and the feed rod is extruded through the extrusion head at a pressure effective for passing the feed rod through the extrusion head.

7. The process of claim 1 wherein in the green fibrous monolith composite article the second portion forms a separation matrix for maintaining the first portion as one or more discrete portions.

8. The process of claim 1 wherein the particle size distribution of the first and second powders is between about 0.01 to about 100 microns.

9. The process of claim 8 wherein the particle size distribution of the first and second powders is between about 1 to about 10 microns.

10. The process of claim 1 wherein the extruded feed rod is deposited in layers onto the surface.

11. The process of claim 1 wherein a computer modeling program assists with manipulating the deposition nozzle and surface in forming the green fibrous monolith composite article from the extruded feed rod.

12. The process of claim 1 wherein the extruded feed rod is deposited with its axis generally parallel to the surface.

13. The process of claim 1 wherein two or more of the feed rods are bundled and passed through the deposition nozzle to form a multifilament extruded fiber and wherein the green fibrous monolith composite article is formed of the multifilament extruded fiber.

14. A process for mechanically forming a green fibrous monolith composite body comprising:

providing a first formable composition including a ceramic or metallic particulate material and a thermoplastic polymer binder;

providing a second formable composition including ceramic or metallic particulate material and a thermoplastic polymer binder, the second composition different from the first composition;

forming a continuous green filament from the first and second formable compositions, the continuous green filament including a central portion of the first composition surrounded by an outer portion of the second composition;

passing the continuous green filament to a mechanically-controlled movable assembly for extruding the green filament and guiding the extruded green filament onto an associated surface; and depositing the extruded green filament in one or more layers onto the associated surface, the one or more layers each having a predetermined filament orientation, to form a green fibrous monolith composite body, wherein the composite body includes one or more discrete portions of the first composition within an essentially continuous matrix of the second composition.

15. The process of claim 14 including providing a third formable composition different from at least the first or the second formable composition and forming the continuous green filament from the first, second and third formable compositions, wherein the green filament includes an outer surrounding portion of the third composition.

16. The process of claim 14 further comprising:

creating a drawing of desired composite object and separating the drawing into a plurality of segments utilizing a computer-aided design program;

generating input signals based on the drawing for directing the movable assembly in depositing the extruded filament onto the associated surface, wherein the movable assembly is controlled and guided in response to the signals.

17. The process of claim 14 further including subjecting the green fibrous monolith composite body to compression forces at a pressure, temperature and time effective for reducing porosity to provide a laminated green fibrous monolith composite body.

18. The process of claim 14 further including heating the composite body at a temperature and for a time effective for removing the thermoplastic polymer binder.

19. The process of claim 18 further including heating the green fibrous monolith composite body at a temperature and for a time effective for consol dating the green fibrous monolith composite body to provide a fully dense fibrous monolith composite object.

* * * * *